(12) United States Patent
Hammond et al.

(10) Patent No.: US 6,642,190 B2
(45) Date of Patent: Nov. 4, 2003

(54) OVERBASED DETERGENT ADDITIVES

(75) Inventors: Steve Hammond, Cheshire (GB); Mark A. Price, Oxfordshire (GB); Philip Skinner, Oxfordshire (GB)

(73) Assignee: Infineum International Ltd. (GB)

( * ) Notice: Subject to any disclaimer, the term of this patent is extended or adjusted under 35 U.S.C. 154(b) by 0 days.

(21) Appl. No.: 10/062,356

(22) Filed: Jan. 31, 2002

(65) Prior Publication Data

US 2003/0004069 A1 Jan. 2, 2003

(30) Foreign Application Priority Data

Feb. 16, 2001 (EP) .............................. 01301406

(51) Int. Cl.⁷ .......................................... C10M 159/22
(52) U.S. Cl. ....................................... 508/460
(58) Field of Search ........................... 508/460

(56) References Cited

U.S. PATENT DOCUMENTS

| | | | |
|---|---|---|---|
| 5,792,735 A | * | 8/1998 | Cook et al. ............... 508/452 |
| 5,808,145 A | | 9/1998 | Le Coent et al. ........... 562/475 |
| 6,103,672 A | * | 8/2000 | Dunn et al. ............... 508/185 |
| 6,153,565 A | * | 11/2000 | Skinner et al. ........... 508/391 |
| 6,159,911 A | * | 12/2000 | Katafuchi ................. 508/391 |
| 6,348,438 B1 | * | 2/2002 | LeCoent et al. ........... 508/332 |

FOREIGN PATENT DOCUMENTS

| | | | |
|---|---|---|---|
| EP | 0 786 448 A2 | 7/1997 | ........... C07C/65/10 |
| WO | WO96/26995 | 9/1996 | ........ C10M/129/10 |
| WO | WO97/46643 | 12/1997 | ........ C10M/159/20 |
| WO | WO97/46644 | 12/1997 | ........ C10M/159/20 |
| WO | WO97/46645 | 12/1997 | ........ C10M/159/22 |
| WO | WO97/46646 | 12/1997 | ........ C10M/159/22 |

\* cited by examiner

Primary Examiner—Ellen M. McAvoy

(57) ABSTRACT

Oil-soluble overbased salicylate-phenate detergent additives comprising a complex in which the basic material of the detergent is stabilized by both salicylate and phenate surfactants. The mass % of the salicylate, as a percentage of the total surfactant mass, is at least 50, preferably greater than 50, provided that, when said mass % is less than 60, the TBN: mass % surfactant ratio of the detergent is 10 or less.

13 Claims, No Drawings

OVERBASED DETERGENT ADDITIVES

This invention relates to oil-soluble overbased salicylate-phenate detergent additives, or concentrates, for lubricating oil compositions, such as compression-ignited (diesel) marine engine lubricating oil compositions.

The term "marine" does not restrict the engines to those used in water-borne vessels; as is understood in the art, it also includes those for auxiliary power generation applications and for main propulsion stationary land-based engines for power-generation.

One type of marine diesel engine is a medium-speed four-stroke engine, frequently referred to as a trunk piston engine. Lubricants (or lubricating oil compositions) for such engines are known and may be referred to as trunk piston engine oils or TPEO's.

Manufacturers commonly design marine diesel engines to use a variety of diesel fuels, ranging from good quality light distillate fuel with low sulfur and asphaltene content to poor quality intermediate or heavy fuel such as "Bunker C" or residual fuel oil with generally higher sulfur and asphaltene content. Lubricants used in such engines are often contaminated with asphaltene components from the fuel. This leads to severe engine cleanliness problems in service (sometimes referred to as "black paint"), a problem which is particularly widespread in four-stroke trunk piston engines where dirty cam boxes, deposits in piston scraper rings and sludge coatings on crankcase walls are found. Further, the lubricant handling system, for example, the heaters, filters and centrifuges, may function less well. The problem may not be confined to four-stroke engines; two-stoke cross-head engines may also be affected.

EP-A-0 662 508 describes a way of overcoming the problem using a composition that includes, as a detergent, a hydrocarbyl-substituted phenate concentrate having a TBN greater than 300 and a hydrocarbyl-substituted salicylate. The data in Example 2 thereof demonstrate that, for a combination of the two detergents, performance is inferior using more salicylate than phenate compared with more phenate than salicylate.

The present invention surprisingly establishes that, when the salicylate and phenate are present in the form of a complex, superior results are achieved when more salicylate than phenate is used. A complex offers the advantages of superior convenience and handleability.

Complex detergents are known: see, for example International Publication Numbers WO's 97/46643, 97/46644, 97/46645, 97/46646 and 97/46647; and EP-A-0 750 659. But, none of the above specifically describes high salicylate content salicylate-phenate detergents according to this invention.

In a first aspect, the present invention is an oil-soluble overbased salicylate-phenate detergent additive comprising a complex wherein basic material of the detergent is stabilised by both salicylate and phenate surfactants, wherein the mass % of the salicylate, as a percentage of the total surfactant mass, is at least 50, preferably greater than 50, provided that, when said mass % is less than 60, the TBN: mass % surfactant ratio of the detergent is 10 or less.

In a second aspect, the present invention is a lubricating oil composition comprising an admixture of an oil of lubricating viscosity, in a major amount, and a detergent additive of the first aspect of the invention, in a minor amount.

In a third aspect, the present invention is a method of lubricating a trunk piston marine diesel engine comprising supplying to the engine a lubricating oil composition of the second aspect of the invention.

In a fourth aspect, the invention is a combination comprising:
(a) mechanical parts to be lubricated of a trunk piston marine diesel engine; and
(b) a lubricating oil composition of the second aspect of the invention.

In a fifth aspect, the invention is the use of a detergent additive of the first aspect of the invention in a lubricating oil composition to suspend asphaltene components in the composition when used in a trunk piston marine diesel engine.

In this specification:

"Major amount" means in excess of 50 mass % of the composition;

"Minor amount" means less than 50 mass % of the compositions, both in respect of the stated additive and in respect of the total mass % of all of the additives present in the composition, reckoned as active ingredient of the additive or additives;

"Comprises or comprising" or cognate words are taken to specify the presence of stated features, steps, integers, or components, but does not preclude the presence or addition of one or more other features, steps, integers, components or groups thereof;

"TBN" is Total Base Number as measured by ASTM D2896; and

"Oil-soluble" or "oil-dispersable" do not necessarily indicate that the additive(s) are soluble, dissolvable, miscible or capable or being suspended in oil, in all proportions. They do mean, however, that they are, for example, soluble or stably dispersably in oil to an extent sufficient to exert their intended effect in the environment in which the oil is employed. Moreover, the additional incorporation of other additives may also permit incorporation of higher levels of a particular additive, if desired.

All percentages reported are mass % on an active ingredient basis, i.e., without regard to carrier or diluent oil, unless otherwise stated.

The percentage of surfactant in the overbased detergent, and the percentages of the individual surfactants, for example, phenol, in the surfactant system, are the percentages measured by the method set out below, which also indicates how the "standardized TBN" of an overbased detergent is determined.

1. Dialysis of the Overbased Detergent and Determination of Standardized TBN

A known amount (A g, approximately 20 g) of the liquid overbased detergent (substantially free from other lubricating oil additives) is dialysed through a membrane in a Soxhlet extractor (150 mm height×75 mm internal diameter) using n-hexane siphoning at a rate of 3 to 4 times per hour for 20 hours. The membrane should be one that retains substantially all the metal-containing material, and passes substantially all the remainder of the sample. An example of a suitable membrane is a gum rubber membrane supplied by Carters Products, Division of Carter Wallace Inc., New York, N.Y. 10105 under the trade name Trojans. The dialysate and residue obtained on completion of the dialysis step are evaporated to dryness, any remaining volatile material then being removed in a vacuum oven (100° C. at less than 1 torr or less than about 130 Pa). The mass of the dried residue, in grams, is designated B. The percentage (C) of overbased detergent material in the liquid sample is given by the equation:

$$C = \frac{B}{A} \times 100\%$$

The "standardized TBN" of the overbased detergent (that is, the TBN expressed in a manner which is independent of the amount of diluent) is the TBN measured according to ASTM D2896 on the dried residue.

Background information for the dialysis technique is given by Amos, R. and Albaugh, E. W. in "Chromatography in Petroleum Analysis", Altgelt, K. H. and Gouw, T. H., Eds, pages 417 to 422, Marcel Dekker, Inc., New York and Basel, 1979.

2. Determination of TBN: % Total Surfactant Ratio

A known amount (D g, approximately 10 g) of the dried residue is hydrolyzed as specified in sections 8.1 to 8.1.2 of ASTM D3712, except that at least 200 ml of 25% by volume hydrochloric acid (sp. gr. 1.18) is used in section 8.1.1. The amount of hydrochloric acid used should be sufficient to effect acidification/hydrolysis of the overbased detergent residue into organic materials (surfactants) and inorganic materials (calcium-containing materials, for example, calcium chloride). The combined ether extracts are dried by passing them through anhydrous sodium sulphate. The sodium sulphate is rinsed with clean ether, and the combined ether solutions are evaporated to dryness (at approximately 110° C.) to yield a hydrolyzed residue. The mass of the dried hydrolyzed residue, in grams, is designated E.

The percentage, Y, of total surfactants in the original liquid overbased detergent is given by the equation $$Y = \frac{E}{D} \times C$$

and the TBN : % total surfactant ratio, X, is given by the equation $$X = \frac{\text{TBN of the liquid overbased detergent}}{Y}$$

It will be noted that, in determining X, the mass of the surfactants in their free form (that is, not in the form of a salt or other derivative) is used. For brevity, X will in general be referred to herein as the "TBN: % surfactant ratio", and it is the value of X that is specified under this term in the claims and elsewhere in this specification.

3. Determination of Individual Surfactants (in Their Free Form) in the Surfactant System The techniques described below isolate the individual surfactants, in hydrolyzed form, from the hydrolyzed surfactant mixture derived from the overbased detergent. As indicated below, the proportion of each individual surfactant is the proportion by mass of the individual surfactant, in hydrolyzed form, in the hydrolyzed surfactant mixture. Thus, where, for example, the overbased detergent contains a calcium phenate/sulphonate/salicylate surfactant system, the proportions of the individual surfactants in the surfactant system are expressed as the proportions of phenol, sulphonic acid and salicylic acid respectively.

The proportions of individual surfactants may be determined by the following method.

A known amount (F g, approximately 1 g) of the dried hydrolyzed residue obtained as described above is placed at the top of a 450×25 mm (internal diameter) fritted glass column filled with 60–100 US mesh Florisil. Florisil is magnesium silicate with a CAS number of 8014-97-9. The column is eluted with a 250 ml portion of each of seven solvents of increasing polarity, namely, heptane, cyclohexane, toluene, ethyl ether, acetone, methanol, and, lastly, a mixture of 50 volume % chloroform, 44 volume % isopropanol, and 6 volume % ammonia solution (sp. gr. 0.88). Each fraction is collected, evaporated to dryness, and the resulting residue is weighed and then analyzed to determine the amount ($G^1$, $G^2$, $G^3$ . . . g) and nature of the surfactant(s) contained in the fraction.

Analysis of the fractions (or of the hydrolyzed residue) can be carried out by, for example, chromatographic, spectroscopic, and/or titration (colour indicator or potentiometric) techniques known to those skilled in the art. Where the overbased detergent contains a sulphonate surfactant and a salicylate surfactant, the sulphonic acid and salicylic acid obtained by hydrolysis of these surfactants will usually be eluted from the column together. In this case, and in any other case where it is necessary to determine the proportion of sulphonic acid in a mixture containing it, the proportion of sulphonic acid in the mixture can be determined by the method described by Epton in Trans.Far.Soc. April 1948, 226.

In the above method, the mass (in grams, designated H1) of a given surfactant, in hydrolyzed form, is determined from the fraction(s) containing it, and thus the proportion of that surfactant in the surfactant system of the original overbased detergent is $$\frac{H^1}{F} \times 100\%$$

The percentages (by mass) of the individual surfactants (in their free form, that is, not in the form of a salt or other derivative) based on the surfactant system can be predicted from the proportions of the surfactants used as starting materials, provided that the percentage of "reactive ingredient" is known for each of the surfactant starting materials. (The term "reactive ingredient" is defined in Note 1 to Tables 1 and 2 in the Examples in this specification.) The percentage of the total surfactants (in their free form) in the liquid overbased product can then be predicted, and the TBN: % surfactant ratio can be determined. Further, the standardized TBN can be predicted, provided that the proportion of the overbased detergent material in the liquid overbased product (that is, the proportion of the liquid overbased product that is not oil or non-reactive surfactant material) is known.

Good correlation has been found between predicted values and values measured as described above.

It should be noted that the lubricating oil compositions of this invention comprise defined individual, i.e., separate, components that may or may not remain the same chemically before and after mixing.

The features of the invention will now be discussed in further detail as follows:

Overbased Detergent

A detergent is an additive that reduces formation of piston deposits, for example high-temperature varnish and lacquer deposits, in engines; it has acid-neutralising properties and is capable of keeping finely divided solids in suspension. It is based on metal "soaps", that is metal salts of acidic organic compounds, sometimes referred to as surfactants.

A detergent comprises a polar head with a long hydrophobic tail, the polar head comprises a metal salt of the acid. Large amounts of a metal base are included by reacting an excess of a metal compound, such as an oxide or hydroxide, with an acidic gas such as carbon dioxide to give an overbased detergent which comprises neutralised detergent as the outer layer of a metal base (e.g. carbonate) micelle. The overbased detergents of this invention may have a TBN of 200 or greater, or 250 or greater, or 300 or greater, such as 300 to 500, preferably 300 to 400.

As stated, the detergent is in the form of a complex wherein the basic material is stabilised by salicylate and phenate surfactants. Complexes are distinguished from mixtures of separate overbased detergents, an example of such a mixture being one of an overbased salicylate detergent with an overbased phenate detergent.

The present detergents may be made, as generally described in International Patent Application Publication Nos WO 9746643/4/5/6 and 7 (mentioned above), as hybrid complexes by neutralising a mixture of a salicylic acid and a phenol with a basic metal compound, and then overbasing. Individual basic micelles of the detergent are thus stabilised by salicylate and phenate.

They may also be made, as generally described in EP-A-0 750 659 (also mentioned above), as a calcium salicylate/phenate complex, by carboxylating a calcium phenate and then sulfurising and overbasing the mixture of calcium salicylate and calcium phenate.

Overbasing preferably takes place at a temperature less than 100° C., more preferably at a temperature less than 80° C., even more preferably at a temperature less than 60° C., even more preferably at a temperature less than 40° C., and most preferably at a temperature less than 35° C.

After overbasing, the mixture is preferably subjected to a 'heat-soaking' step in which the mixture is maintained, without addition of any further chemical reagents, in a selected temperature range (or at a selected temperature), which is normally equal to or higher than the temperature at which carbonation is effected, for a period before any further processing steps are carried out. This mixture is normally stirred during heat-soaking. Heat-soaking may be carried out for any suitable period of at least 30 minutes, preferably at least 45 minutes, more preferably at least 60 minutes, especially at least 90 minutes. Temperatures at which heat-soaking may be carried out are typically in the range of from 15° C. to just below the reflux temperature of the reaction mixture, preferably 25° C. to 60° C.; the temperature should be such that substantially no materials (for example, solvents) are removed from the system during the heat-soaking step.

Optionally, following the first carbonation step (and the heat-soaking step, if used), a further quantity of basic calcium compound is added to the mixture and the mixture is again carbonated, the second carbonation step advantageously being followed by a heat-soaking step.

Basic calcium compounds for use in manufacture of the overbased detergents include calcium oxide, hydroxide, alkoxides, carboxylates and mixtures thereof.

The mixture to be overbased by the overbasing agents should normally contain water, and may also contain one or more solvents, promoters or other substances commonly used in overbasing processes. Suitable solvents are benzene, alkyl-substituted benzene (for example, toluene or xylene), halogen-substituted benzenes and lower alcohols with up to 8 carbon atoms. Preferred solvents are toluene, methanol and mixtures thereof. Preferred promoters are methanol, water and mixtures thereof.

The detergent of the invention may be an alkali or alkaline earth metal, e.g., sodium, potassium, lithium, calcium, and magnesium, detergent. Calcium is preferred.

Surfactants for the surfactant system of the overbased metal detergent may contain at least one hydrocarbyl group, for example, as a substituent on an aromatic ring. The term "hydrocarbyl" as used herein means that the group concerned is primarily composed of hydrogen and carbon atoms and is bonded to the remainder of the molecule via a carbon atom, but does not exclude the presence of other atoms or groups in a proportion insufficient to detract from the substantially hydrocarbon characteristics of the group. Advantageously, hydrocarbyl groups in surfactants for use in accordance with the invention are aliphatic groups, preferably alkyl or alkylene groups, especially alkyl groups, which may be linear or branched. The total number of carbon atoms in the surfactants should be at least sufficient to impart the desired oil-solubility.

Salicylates of the invention may be non-sulphurized or sulphurized, and may be chemically modified and/or contain additional substituents, for example, as discussed below for phenates. Processes similar to those described below may also be used for sulphurizing a hydrocarbyl-substituted salicylic acid, and are known to those skilled in the art. Salicylic acids are typically prepared by the carboxylation, by the Kolbe-Schmitt process, of phenoxides, and in that case, will generally be obtained (normally in a diluent) in admixture with uncarboxylated phenol.

Preferred substituents in salicylates are those represented by R in the description of phenols below. In alkyl-substituted salicylicates, the alkyl groups advantageously contain 5 to 100 carbon atoms, preferably 9 to 30 carbon atoms, especially 14 to 20 carbon atoms.

Phenates of the invention may be non-sulphurized or, preferably, sulphurized. Further, the term includes phenates derived from phenols containing more than one hydroxyl group (for example, alkyl catechols) or fused aromatic rings (for example, alkyl naphthols) and phenols which have been modified by chemical reaction, for example, alkylene-bridged phenols and Mannich base-condensed phenols; and saligenin-type phenols (produced by the reaction of a phenol and an aldehyde under basic conditions).

Preferred phenates are those derived from phenols of the formula:

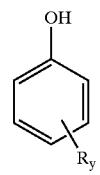

where R represents a hydrocarbyl group and y represents 1 to 4. Where y is greater than 1, the hydrocarbyl groups may be the same or different.

The phenols from which the phenates are derived are frequently in sulphurized form. Sulphurized hydrocarbyl phenols may typically be represented by the formula:

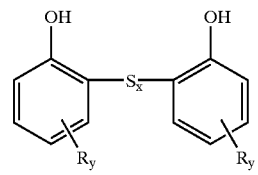

where x is generally from 1 to 4. In some cases, more than two phenol molecules may be linked by $S_x$ bridges.

In the above formulae, hydrocarbyl groups represented by R are advantageously alkyl groups, which advantageously contain 5 to 100 carbon atoms, preferably 5 to 40 carbon atoms, especially 9 to 12 carbon atoms, the average number of carbon atoms in all of the R groups being at least about 9 in order to ensure adequate solubility in oil. Preferred alkyl groups are nonyl (tripropylene) groups.

In the following discussion, hydrocarbyl-substituted phenols will for convenience be referred to as alkyl phenols.

A sulphurizing agent for use in preparing a sulphurized phenol or phenate may be any compound or element which introduces —$(S)_x$— bridging groups between the alkyl phenol monomer groups, wherein x is generally from 1 to about 4. Thus, the reaction may be conducted with elemental sulphur or a halide thereof, for example, sulphur dichloride or, more preferably, sulphur monochloride. If elemental sulphur is used, the sulphurization reaction may be effected by heating the alkyl phenol compound at from 50 to 250° C., and preferably at least 100° C. The use of elemental sulphur will typically yield a mixture of bridging groups —$(S)_x$— as described above. If a sulphur halide is used, the sulphurization reaction may be effected by treating the alkyl phenol at from −10° C. to 120° C., preferably at least 60° C. The reaction may be conducted in the presence of a suitable diluent. The diluent advantageously comprises a substantially inert organic diluent, for example mineral oil or an alkane. In any event, the reaction is conducted for a period of time sufficient to effect substantial reaction. It is generally preferred to employ from 0.1 to 5 moles of the alkyl phenol material per equivalent of sulphurizing agent.

Where elemental sulphur is used as the sulphurizing agent, it may be desirable to use a basic catalyst, for example, sodium hydroxide or an organic amine, preferably a heterocyclic amine (e.g., morpholine).

Details of sulphurization processes are well known to those skilled in the art.

In one form of the invention, the salicylate-phenate may be non-sulfurised.

In the detergents of the invention, the TBN: mass % surfactant ratio is preferably 10 or less when the mass % of salicylate in the detergent is 60 or greater. International Publication Number WO 97/46645 describes how the TBN: mass % surfactant ratio may be measured.

It is also preferred that the mass % of the salicylate, as a percentage of the total surfactant mass, is 65 or greater, preferably 70 or greater, or more preferably 75 or greater.

It is preferred that the salicylate surfactant content of the detergent is greater than 30, such as greater than 35, mass %, and that the phenate surfactant content of the detergent is greater than 8, such as 10 or greater, mass %.

Advantageously, the detergents of the invention have a kinematic viscosity, at 100° C., of less than 1,000 $mm^2s^{-1}$, preferably between 50 and 1,000 $mm^2s^{-1}$, more preferably between 100 and 500 $mm2s^{-1}$.

Lubricating Oil Compositions

To provide the second aspect of the invention, the overbased detergents may be incorporated into an oil of lubricating viscosity (or basestock) in any convenient way. Thus, they may be added directly to the oil by dispersing or dissolving them in the oil at the desired concentration optimally with the aid of a suitable solvent such as toluene or cyclohexane, and at ambient or elevated temperature.

Because the detergents of the invention posses both high TBN and high active matter content, it is possible to blend lubricating oil compositions that have relatively high TBN and organic carboxylate surfactant concentrations, at lower detergent treat rates than hitherto.

Preferably, the composition is a marine lubricant such as a TPEO.

The lubricating oil compositions of this invention have been found to be particularly efficacious in mitigating aforementioned "black paint" problem.

The base stock for the composition may be synthetic or natural.

Synthetic base stocks include alkyl esters of dicarboxylic acids, polyglycols and alcohols; poly-α-olefins, including polybutenes; alkyl benzenes; organic esters of phosphoric acids; and polysilicone oils.

Natural base stocks include mineral lubricating oils which may vary widely as to their crude source, for example, as to whether they are paraffinic, napthenic, mixed, or paraffinic-napthenic, as well as to the method used in their production, for example, their distillation range and where they are straight run or cracked, hydrofined, or solvent extracted.

Lubricating oil base stocks suitable for use in crankcase lubricants conveniently have a viscosity of 2.5 to 12 $mm^2$/s, at 100° C., although base stocks with other viscosities may also be used, for example, bright stock.

Lubricating oil base stocks suitable for use in marine lubricants conveniently have a viscosity of typically 3 to 15 $mm^2$/s, at 100° C., although base stocks with other viscosities may also be used. Thus, for example, bright stocks, which typically have a viscosity of 30 to 35 $mm^2$/s at 100° C. may be used.

Additional additives may be incorporated in the composition to enable it to meet particular requirements. Examples of additional additives which may be included in lubricating oil compositions containing an overbased detergent in accordance with the invention are viscosity index improvers, corrosion inhibitors, oxidation inhibitors or antioxidants, friction modifiers, dispersants, other detergents, metal rust inhibitors, anti-wear agents, pour point depressants, and anti-foaming agents. Lubricating oils suitable for use in marine engines advantageously include a dispersant and an antiwear agent as additional antioxidants, antifoaming agents and/or rust inhibitors. Certain of the additional additives specified below are more appropriate for use in lubricants for automobile engine than for use in lubricants for marine engines.

The compositions may typically contain 5 to 40 mass % of additives, the remainder being base oil.

EXAMPLE

The following example illustrates, but in no way limit, the invention.

Preparation of Overbased Calcium Salicylate-Phenate Detergent 673 g toluene, 191 g methanol, 33 g water, and 19 g of diluent oil (SN150) were introduced into a reactor and mixed while maintaining the temperature at approximately 20° C. Calcium hydroxide ($Ca(OH)_2$) (136 g) was added, and the mixture was heated to 40° C., with stirring. To the slurry obtained in this way was added 521 g of alkylsalicylic acid and 134 g of sulphurised nonyl phenol.

The temperature of the mixture was reduced to approximately 28° C., and maintained at this temperature while carbon dioxide (44 g) was injected into the mixture over a period of 90–120 minutes. The temperature was then raised to 60° C. over 60 minutes, following which the mixture was cooled to a temperature of approximately 28° C. over 30 minutes. At 28° C., a further quantity of calcium hydroxide (88 g) was added and then the temperature was maintained at approximately 28° C. while carbon dioxide (44 g) was again injected into the mixture over a period of 90–120 minutes. After this second carbonation step, the temperature was raised to 60° C. over 90 minutes. During this heat treatment period, when the temperature reached 45° C., a further charge of diluent oil (41 g) was added.

To complete the synthesis, the product was heated from 60 to 160° C. in four hours to remove the solvents and water. This solvent stripping process was performed in three stages:

under atmospheric pressure to 114° C., at which point a final charge of diluent oil (40 g) was added;

under a pressure of 500 mbar between 114° C. and 125° C.; and under a pressure of 250 mbar between 125° C. and 160° C.

Finally, the product was filtered to remove sediment and further diluted with base oil (30 g).

Characteristics of the overbased detergent made by this process are as follows:

TBN=325 mgKOH/g (measured by ASTM D2896);

Kv100=277cSt (measured by ASTM D445); and

Active ingredient content=86% (calculated as, [mass of final product−mass of base oil]/[mass of final product]).

What is claimed is:

1. An oil-soluble overbased salicylate-phenate detergent additive consisting essentially of a complex wherein basic material of the detergent is stabilised by surfactant consisting essentially of both salicylate and phenate surfactants, wherein the mass % of the salicylate, as a percentage of the total surfactant mass, is at least 50, provided that, when said mass % is less than 60, the TBN: mass % surfactant ratio of the detergent is 10 or less.

2. The detergent as claimed in claim 1, wherein the TBN: mass % surfactant ratio is 10 or less when mass % of the salicylate is 60 or greater.

3. The detergent as claimed in claim 1, wherein the mass % of the salicylate, as a percentage of the total surfactant mass, is 65 or greater.

4. The detergent as claimed in claim 1, wherein the detergent is an alkaline earth metal detergent.

5. The detergent as claimed in claim 1, having a TBN of 200 or greater.

6. The detergent as claimed in claim 1, having a kinematic viscosity, at 100° C., of less than 1,000 $mm^2s^{-1}$.

7. The detergent as claimed in claim 1, wherein the salicylate surfactant content of the detergent is greater than 30 mass % and the phenate surfactant content of the detergent is greater than 8 mass %.

8. The detergent as claimed in claim 1, wherein the detergent is a hybrid complex made by neutralising a mixture of a salicylic acid and a phenol, and then overbasing.

9. The detergent as claimed in claim 1, wherein the detergent is made by neutralising a phenol, carboxylating the resulting phenate, and subsequently overbasing.

10. A lubricating oil composition comprising an admixture of an oil of lubricating viscosity, in a major amount, and a detergent additive as claimed in claim 1, in a minor amount.

11. The lubricating oil composition as claimed in claim 10, in the form of a marine lubricant.

12. The lubricating oil composition as claimed in claim 11, additionally comprising a fuel oil with a residual oil content.

13. A method of lubricating a trunk piston marine diesel engine comprising supplying to the engine a lubricating oil composition as claimed in claim 11.

* * * * *